(12) United States Patent
Chan et al.

(10) Patent No.: US 7,814,065 B2
(45) Date of Patent: Oct. 12, 2010

(54) AFFINITY-BASED RECOVERY/FAILOVER IN A CLUSTER ENVIRONMENT

(75) Inventors: Wilson Wai Shun Chan, San Mateo, CA (US); Angelo Pruscino, Los Altos, CA (US); Stefan Roesch, San Mateo, CA (US); Michael Zoll, Redwood City, CA (US); Tolga Yurek, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 354 days.

(21) Appl. No.: 11/205,529

(22) Filed: Aug. 16, 2005

(65) Prior Publication Data

US 2007/0043726 A1    Feb. 22, 2007

(51) Int. Cl.
G06F 17/30 (2006.01)
(52) U.S. Cl. ...................................................... 707/674
(58) Field of Classification Search .................. 707/674
See application file for complete search history.

(56) References Cited

U.S. PATENT DOCUMENTS

| | | | |
|---|---|---|---|
| 4,633,387 A | | 12/1986 | Hartung et al. |
| 4,663,709 A | | 5/1987 | Fujiwara et al. |
| 4,809,157 A | * | 2/1989 | Eilert et al. ................. 718/104 |
| 4,827,411 A | | 5/1989 | Arrowood et al. |
| 4,873,517 A | | 10/1989 | Baratz et al. |
| 4,914,571 A | | 4/1990 | Baratz et al. |
| 4,972,316 A | | 11/1990 | Dixon et al. |
| 4,972,437 A | | 11/1990 | Citron et al. |
| 4,980,822 A | | 12/1990 | Brantley et al. |
| 5,101,348 A | | 3/1992 | Arrowood et al. |
| 5,109,483 A | | 4/1992 | Baratz et al. |
| 5,239,649 A | * | 8/1993 | McBride et al. ............. 718/105 |
| 5,249,291 A | * | 9/1993 | Williams ..................... 726/35 |
| 5,283,897 A | * | 2/1994 | Georgiadis et al. .......... 718/105 |
| 5,307,485 A | | 4/1994 | Bordonaro |
| 5,313,051 A | | 5/1994 | Brigida et al. |

(Continued)

FOREIGN PATENT DOCUMENTS

CA    2 435 388 A1    1/2003

(Continued)

OTHER PUBLICATIONS

European Patent Office, "Communication pursuant to Article 96(2) EPC," Dated Nov. 2, 2005, 6 pages.

(Continued)

*Primary Examiner*—Neveen Abel Jalil
*Assistant Examiner*—Mark Andrew X Radtke
(74) *Attorney, Agent, or Firm*—Hickman Palermo Truong & Becker LLP; Adam C. Stone

(57) ABSTRACT

Techniques are provided for responding to the termination of a node by selecting another node, and assigning to the selected node the affinity relationships that existed between the terminated node and one or more objects. The resources that belong to the objects involved in the affinity relationships are remastered to the selected node. The selected node then performs recovery of the resources that had been opened by the terminated node and/or serves as a failover node to execute the transactions that had been executing on the terminated node.

18 Claims, 3 Drawing Sheets

U.S. PATENT DOCUMENTS

| | | | |
|---|---|---|---|
| 5,319,773 A | 6/1994 | Britton et al. | |
| 5,325,525 A | 6/1994 | Shan et al. | |
| 5,333,313 A | 7/1994 | Heising | |
| 5,377,350 A * | 12/1994 | Skinner | 719/316 |
| 5,432,926 A | 7/1995 | Citron et al. | |
| 5,440,732 A * | 8/1995 | Lomet et al. | 707/1 |
| 5,448,727 A | 9/1995 | Annevelink | |
| 5,490,261 A | 2/1996 | Bean et al. | |
| 5,539,883 A | 7/1996 | Allon et al. | |
| 5,546,575 A | 8/1996 | Potter et al. | |
| 5,581,737 A | 12/1996 | Dahlen et al. | |
| 5,592,671 A | 1/1997 | Hirayama et al. | |
| 5,612,856 A | 3/1997 | Albach | |
| 5,613,060 A | 3/1997 | Britton et al. | |
| 5,625,811 A | 4/1997 | Bhide et al. | |
| 5,640,556 A | 6/1997 | Tamura | |
| 5,675,791 A | 10/1997 | Bhide et al. | |
| 5,692,182 A | 11/1997 | Desai et al. | |
| 5,710,915 A | 1/1998 | McElhiney | |
| 5,717,919 A | 2/1998 | Kodavalla et al. | |
| 5,740,362 A | 4/1998 | Buickel et al. | |
| 5,761,500 A | 6/1998 | Gallant et al. | |
| 5,761,512 A * | 6/1998 | Breslau et al. | 717/140 |
| 5,784,697 A * | 7/1998 | Funk et al. | 711/170 |
| 5,794,229 A | 8/1998 | French et al. | |
| 5,822,531 A * | 10/1998 | Gorczyca et al. | 709/221 |
| 5,845,326 A | 12/1998 | Hirayama et al. | |
| 5,848,408 A | 12/1998 | Jakobsson et al. | |
| 5,860,137 A | 1/1999 | Raz et al. | |
| 5,870,743 A | 2/1999 | Cohen et al. | |
| 5,892,754 A | 4/1999 | Kompella et al. | |
| 5,892,945 A | 4/1999 | Mirchandaney et al. | |
| 5,897,632 A | 4/1999 | Dar et al. | |
| 5,907,849 A | 5/1999 | Dias et al. | |
| 5,920,872 A * | 7/1999 | Grewell et al. | 707/202 |
| 5,946,685 A * | 8/1999 | Cramer et al. | 707/10 |
| 5,950,188 A | 9/1999 | Wildermuth | |
| 5,956,704 A | 9/1999 | Gautam et al. | |
| 5,964,838 A * | 10/1999 | Cheung et al. | 709/224 |
| 5,970,495 A | 10/1999 | Baru et al. | |
| 6,003,036 A | 12/1999 | Martin | |
| 6,011,918 A | 1/2000 | Cohen et al. | |
| 6,023,702 A | 2/2000 | Leisten et al. | |
| 6,058,389 A | 5/2000 | Chandra et al. | |
| 6,069,705 A | 5/2000 | Suvarna | |
| 6,078,990 A | 6/2000 | Frazier | |
| 6,081,900 A | 6/2000 | Subramaniam et al. | |
| 6,088,758 A | 7/2000 | Kaufman et al. | |
| 6,092,062 A | 7/2000 | Lohman et al. | |
| 6,101,495 A | 8/2000 | Tsuchida et al. | |
| 6,108,654 A | 8/2000 | Chan et al. | |
| 6,112,198 A | 8/2000 | Lohman et al. | |
| 6,112,225 A | 8/2000 | Kraft et al. | |
| 6,115,830 A | 9/2000 | Zabarsky | |
| 6,128,762 A | 10/2000 | Jadav et al. | |
| 6,173,313 B1 * | 1/2001 | Klots et al. | 709/203 |
| 6,178,529 B1 | 1/2001 | Short | |
| 6,185,601 B1 | 2/2001 | Wolff | |
| 6,192,483 B1 | 2/2001 | Moiin et al. | |
| 6,208,994 B1 * | 3/2001 | Abdelnur | 707/103 R |
| 6,219,666 B1 | 4/2001 | Krishnaswamy et al. | |
| 6,223,182 B1 | 4/2001 | Agarwal et al. | |
| 6,240,417 B1 | 5/2001 | Eastwick et al. | |
| 6,240,428 B1 | 5/2001 | Yeung et al. | |
| 6,240,466 B1 * | 5/2001 | McKeehan et al. | 719/316 |
| 6,249,802 B1 * | 6/2001 | Richardson et al. | 709/200 |
| 6,249,879 B1 | 6/2001 | Walker | |
| 6,253,229 B1 | 6/2001 | Nielsen et al. | |
| 6,253,273 B1 | 6/2001 | Blumenau | |
| 6,263,331 B1 | 7/2001 | Liu et al. | |
| 6,272,491 B1 * | 8/2001 | Chan et al. | 707/8 |
| 6,279,111 B1 * | 8/2001 | Jensenworth et al. | 707/8 |
| 6,295,541 B1 | 9/2001 | Bodnar et al. | |
| 6,311,265 B1 | 10/2001 | Beckerle et al. | |
| 6,321,238 B1 | 11/2001 | Putzolu | |
| 6,321,240 B1 * | 11/2001 | Chilimbi et al. | 707/206 |
| 6,321,563 B1 * | 11/2001 | Hotea et al. | 718/104 |
| 6,330,556 B1 * | 12/2001 | Chilimbi et al. | 707/2 |
| 6,336,177 B1 * | 1/2002 | Stevens | 711/170 |
| 6,341,340 B1 | 1/2002 | Tsukerman et al. | |
| 6,345,288 B1 | 2/2002 | Reed et al. | |
| 6,363,396 B1 * | 3/2002 | Klots et al. | 707/103 Y |
| 6,370,619 B1 | 4/2002 | Ho et al. | |
| 6,385,613 B1 * | 5/2002 | Grewell et al. | 707/8 |
| 6,405,274 B1 * | 6/2002 | Chan | 710/200 |
| 6,424,992 B2 * | 7/2002 | Devarakonda et al. | 709/203 |
| 6,438,714 B1 | 8/2002 | Canestaro et al. | |
| 6,453,404 B1 | 9/2002 | Bereznyl et al. | |
| 6,480,895 B1 | 11/2002 | Gray et al. | |
| 6,529,906 B1 * | 3/2003 | Chan | 707/8 |
| 6,549,931 B1 * | 4/2003 | Amor et al. | 718/104 |
| 6,567,509 B1 | 5/2003 | Gusler et al. | |
| 6,567,811 B1 | 5/2003 | Edwards et al. | |
| 6,594,698 B1 | 7/2003 | Chow et al. | |
| 6,611,899 B2 | 8/2003 | Takahashi et al. | |
| 6,615,203 B1 | 9/2003 | Lin et al. | |
| 6,618,851 B1 | 9/2003 | Zundel et al. | |
| 6,636,248 B1 | 10/2003 | Christensen et al. | |
| 6,658,448 B1 * | 12/2003 | Stefaniak et al. | 718/104 |
| 6,711,571 B2 | 3/2004 | Putzolu | |
| 6,735,613 B1 * | 5/2004 | Jean-Dominique et al. | 718/104 |
| 6,751,616 B1 * | 6/2004 | Chan | 707/8 |
| 6,892,210 B1 | 5/2005 | Erickson et al. | |
| 6,920,454 B1 * | 7/2005 | Chan | 707/8 |
| 6,978,279 B1 | 12/2005 | Lomet et al. | |
| 6,981,104 B2 | 12/2005 | Prabhu | |
| 7,031,956 B1 | 4/2006 | Lee et al. | |
| 7,080,075 B1 * | 7/2006 | Chan et al. | 707/8 |
| 7,085,911 B2 | 8/2006 | Sachedina et al. | |
| 7,120,645 B2 | 10/2006 | Manikutty et al. | |
| 7,191,172 B2 * | 3/2007 | McGrath et al. | 707/2 |
| 7,194,462 B2 | 3/2007 | Riccardi et al. | |
| 7,203,748 B2 * | 4/2007 | Hare et al. | 709/224 |
| 7,266,764 B1 | 9/2007 | Flam | |
| 7,315,852 B2 | 1/2008 | Balmin et al. | |
| 7,324,972 B1 | 1/2008 | Oliver et al. | |
| 7,380,039 B2 * | 5/2008 | Miloushev et al. | 710/244 |
| 7,386,568 B2 | 6/2008 | Warner et al. | |
| 7,386,630 B2 * | 6/2008 | Liong et al. | 709/238 |
| 7,493,400 B2 * | 2/2009 | Loaiza et al. | 709/227 |
| 2002/0038301 A1 | 3/2002 | Aridor et al. | |
| 2002/0040357 A1 | 4/2002 | Miller | |
| 2002/0073019 A1 | 6/2002 | Deaton | |
| 2002/0116457 A1 | 8/2002 | Eshleman et al. | |
| 2002/0124082 A1 | 9/2002 | San Andres et al. | |
| 2003/0023728 A1 | 1/2003 | Yaung | |
| 2003/0028550 A1 | 2/2003 | Lee et al. | |
| 2003/0036882 A1 | 2/2003 | Harper et al. | |
| 2003/0041215 A1 | 2/2003 | George et al. | |
| 2003/0097383 A1 | 5/2003 | Smirnov et al. | |
| 2003/0115548 A1 | 6/2003 | Melger | |
| 2003/0140308 A1 | 7/2003 | Murthy et al. | |
| 2003/0149698 A1 * | 8/2003 | Hoggatt | 707/100 |
| 2004/0064466 A1 | 4/2004 | Manikutty et al. | |
| 2004/0148278 A1 | 7/2004 | Milo et al. | |
| 2004/0172422 A1 | 9/2004 | Putzolu | |
| 2004/0199919 A1 * | 10/2004 | Tovinkere | 718/102 |
| 2004/0215640 A1 | 10/2004 | Bamford et al. | |
| 2004/0220912 A1 | 11/2004 | Manikutty et al. | |
| 2004/0267760 A1 | 12/2004 | Brundage et al. | |
| 2005/0065949 A1 | 3/2005 | Warner et al. | |
| 2005/0097084 A1 | 5/2005 | Balmin et al. | |
| 2005/0228791 A1 | 10/2005 | Thusoo et al. | |
| 2005/0240553 A1 * | 10/2005 | Diggs et al. | 707/1 |

| | | | |
|---|---|---|---|
| 2005/0289125 | A1 | 12/2005 | Liu et al. |
| 2006/0074901 | A1 | 4/2006 | Pirahesh et al. |
| 2006/0090139 | A1* | 4/2006 | Jenni et al. .................. 715/760 |
| 2006/0129634 | A1* | 6/2006 | Khouzam et al. ........... 709/203 |
| 2006/0143350 | A1* | 6/2006 | Miloushev et al. .......... 710/242 |
| 2006/0149731 | A1* | 7/2006 | Schirmer et al. ............... 707/6 |
| 2006/0235840 | A1 | 10/2006 | Manikutty et al. |
| 2006/0265414 | A1* | 11/2006 | Loaiza et al. ............... 707/102 |
| 2006/0265420 | A1* | 11/2006 | Macnaughton et al. ... 707/104.1 |

FOREIGN PATENT DOCUMENTS

| | | |
|---|---|---|
| EP | 0483424 | 5/1992 |
| EP | 0642092 | 3/1995 |
| EP | 1521184 | 4/2005 |
| WO | WO 97/04384 A1 | 2/1997 |
| WO | WO 98/54648 A1 | 12/1998 |
| WO | WO 99/44130 | 9/1999 |
| WO | WO 02/073416 | 9/2002 |
| WO | WO 2005/013155 A1 | 2/2005 |

OTHER PUBLICATIONS

Current Claims, EP 99 968 071.3, 8 pages.
Cheevers, Sandra, "Oracle 9*i* Database Summary, An Oracle White Paper," Oracle Corporation, May 2002, pp. 1-35.
Hansell, Daniela, "Managing Oracle9*i* Real Application Clusters, An Oracle White Paper," Oracle Corporation, Mar. 2001, 12 pages.
Oracle Corporation, "Oracle9*i* Real Application Clusters Administration," Release 1 (9.0.1), Part No. A89869-02, 1996-2001, Ch. 1-4, 9, 98 pages.
Oracle Corporation, "Oracle9*i* Real Application Clusters Installation and Configuration," Release 1 (9.0.1), Part No. A89868-02, 1996-2001; Ch. 4-5, 33 pages.
Bridge, W., "The Oracle Universal Server Buffer Manager," Proceedings of the 23$^{rd}$ VLDB Conference, Athens Greece, 1997, pp. 590-594.
Oracle Corporation, "Introducing Oracle Parallel Server," Oracle8*i* Parallel Server Setup and Configuration Guide, Release 8.1.5, Chapter 1, 1999, retrieved from the internet at <http://www.csee.umbc.edu/help/oracle8/server.815/a67439/chap1.htm>, retrieved on Nov. 4, 2005, 15 pages.
Oracle Corporation, "Overview of Locking Mechanisms," Oracle8*i* Parallel Server Concepts and Administration, Release 8.1.5, chapter 7, 1999, retrieved from the internet at <http://www.csee.umbc.edu/help/oracle8/server.815/a67778/ch7_lock.htm>, retrieved on Nov. 4, 2005, 12 pages.
Oracle Corporation, "Integrated Distributed Lock Manager," Oracle8*i* Parallel Server Concepts and Administration, Release 8.1.5, chapter 8, 1999, retrieved from the internet at <http://www.csee.umbc.edu/help/oracle8/server.815/a67778/ch8_1m.htm>, retrieved on Nov. 4, 2005, 8 pages.
Notification of Transmittal of the International Search Report and the Written Opinion of the International Searching Authority, or the Declaration received in International application No. PCT/US2006/030961(11 pages).
Abdallah, Maha et al., "One-Phase Commit: Does It Make Sense?" IEEE (1998), pp. 182-192.
Chandrasekaran, Sashikanth et al., "Shared Cache—The Future of Parallel Databases" IEEE (2003), pp. 840-850.
Lee, Inseon, et al., "A Single Phase Distributed Commit Protocol for Main Memory Database Systems" IEEE (2002), 8 pages.
Samaras, George et al., "Two-Phase Commit Optimization and Tradeoffs in the Commercial Environment" IEEE (1993), pp. 520-529.
Bauer, Mark, "Oracle 8i Parallel Server, Concepts and Administration," Release 8.1.5, Feb. 1999, Part No. A67778-01, XP-002342804, 12 pages.
Chu et al., Choices in Database Workstation-Server Architecture, IEEE, 1993, pp. 298-305.
Clarke, Sue, "Teradata NCR," Butler Group Research Paper, Oct. 2000, XP-002361003, 4 pages.
Devlin, Bill et al., "Scalability Terminology: Farms, Clones, Partitions, and Packs: RACS and RAPS," Microsoft Corporation Technical Report MS-TR-99-85, Dec. 1999, XP-002342802, pp. 1-8.
Hallmark, Gary, "Oracle Parallel Warehouse Server," Oracle Corporation, IEEE 1997, XP-10218553, pp. 314-321.
Hutton, "Managing Various Levels of a Large Software System," IEEE, 1988, pp. 177-184.
Norman, Michael G. et al., "Much Ado About Shared-Nothing," SIGMOND Record, vol. 25, No. 3, Sep. 1996, XP-002342801, pp. 16-21.
Rahm, Erhard, "Concurrency and Coherency Control in Database Sharing Systems," Technical Report ZRI 3/91, Dec. 1991, revised Mar. 1993, XP-002361004, pp. 1-62.
Sokolinsky, Leonid B., "Choosing Multiprocessor System Architecture for Parallel Database Systems," Workshop on Computer Science and Information Technologies CSIT'2000, Ufa, Russia, 2000, XP-002342803, p. 1-8.
W3C, "XML Path Language (XPath) 2.0", W3C Candidate Recommendation Nov. 3, 2005, located at http://www.w3.org/TR/xpath20/, 128 pgs.
Microsoft, "Microsoft Computer Dictionary", Microsoft Press, Fifth Edition, 2002, 3 pages.
Krishnaprasad, Muralidhar et al., Proceedings of the Thirteenth international conference on Very large databases, 2004, vol. 30, pp. 1134-1145.

* cited by examiner

US 7,814,065 B2

AFFINITY-BASED RECOVERY/FAILOVER IN A CLUSTER ENVIRONMENT

RELATED APPLICATIONS

The present application is related to the following U.S. patent applications, which are collectively referred to herein as the ("Related Applications"):

U.S. patent application Ser. No. 11/132,811, now issued U.S. Patent 7,493,400, entitled "Creating And Dissolving Affinity Relationships in a Cluster", filed by Juan R. Loaiza, Neil James Scott Macnaughton, and Sashikanth Chandrasekaran, on same day herewith, the contents of which are incorporated herein by this reference; and U.S. patent application Ser. No. 11/132,807, entitled "Determining Affinity in a Cluster", filed by Neil James Scott Macnaughton and Sashikanth Chandrasekaran, on same day herewith, the contents of which are incorporated herein by this reference.

FIELD OF THE INVENTION

The present invention relates to database systems and, more specifically, to techniques for performing recover/failover operations in database systems where objects are mastered based on affinity to nodes.

BACKGROUND

Within the context of computer systems, many types of resources can be shared among processes. However, many resources, though sharable, may not be accessed in certain ways by more than one process at any given time. For example, resources such as data blocks of a storage medium or tables stored on a storage medium may be concurrently accessed in some ways (e.g. read) by multiple processes, but accessed in other ways (e.g. written to) by only one process at a time. Consequently, mechanisms have been developed which control access to resources.

One such mechanism is referred to as a lock. A lock is a data structure that indicates that a particular process has been granted certain rights with respect to a resource. There are many types of locks. Some types of locks may be shared on the same resource by many processes, while other types of locks prevent any other locks from being granted on the same resource.

The entity responsible for granting locks on resources is referred to as a lock manager. In a single node database system, a lock manager will typically consist of one or more processes on the node. In a multiple-node system, such as a multi-processing machine or a local area network, a lock manager may include processes distributed over numerous nodes. A lock manager that includes components that reside on two or more nodes is referred to as a distributed lock manager.

FIG. 1 is a block diagram of a multiple-node computer system 100. Each node has stored therein a database server and a portion of a distributed lock management system 132. Specifically, the illustrated system includes three nodes 102, 112 and 122 on which reside database servers 104, 114 and 124, respectively, and lock manager units 106, 116 and 126, respectively. Database servers 104, 114 and 124 have access to the same. database 120. The database 120 resides on a disk 118 that contains multiple blocks of data. Disk 118 generally represents one or more persistent storage devices which may be on any number of machines, including but not limited to the machines that contain nodes 102, 112 and 122.

A communication mechanism allows processes on nodes 102, 112, and 122 to communicate with each other and with the disks that contain portions of database 120. The specific communication mechanism between the nodes and disk 118 will vary based on the nature of system 100. For example, if the nodes 102, 112 and 122 correspond to workstations on a network, the communication mechanism will be different than if the nodes 102, 112 and 122 correspond to clusters of processors and memory within a multi-processing machine.

Before any of database servers 104, 114 and 124 can access a resource shared with the other database servers, it must obtain the appropriate lock on the resource from the distributed lock management system 132. Such a resource may be, for example, one or more blocks of disk 118 on which data from database 120 is stored.

Lock management system 132 stores data structures that indicate the locks held by database servers 104, 114 and 124 on the resources shared by the database servers. If one database server requests a lock on a resource while another database server has a lock on the resource, then the distributed lock management system 132 must determine whether the requested lock is consistent with the granted lock. If the requested lock is not consistent with the granted lock, then the requester must wait until the database server holding the granted lock releases the granted lock.

According to one approach, lock management system 132 maintains one master resource object for every resource managed by lock management system 132, and includes one lock manager unit for each node that contains a database server. The master resource object for a particular resource stores, among other things, an indication of all locks that have been granted on or requested for the particular resource. The master resource object for each resource resides within only one of the lock manager units 106, 116 and 126.

The node on which a lock manager unit resides is referred to as the "master node" (or simply "master") of the resources whose master resource objects are managed by that lock manager unit. Thus, if the master resource object for a resource R1 is managed by lock manager unit 106, then node 102 is the master of resource R1.

In typical systems, a hash function is employed to select the particular node that acts as the master node for a given resource. For example, system 100 includes three nodes, and therefore may employ a hash function that produces three values: 0, 1 and 2. Each value is associated with one of the three nodes. The node that will serve as the master for a particular resource in system 100 is determined by applying the hash function to the name of the resource. All resources that have names that hash to 0 are mastered on node 102. All resources that have names that hash to 1 are mastered on node 112. All resources that have names that hash to 2 are mastered on node 122.

When a process on a node wishes to access a resource, a hash function is applied to the name of the resource to determine the master of the resource, and a lock request is sent to the master node for that resource. The lock manager on the master node for the resource controls the allocation and deallocation of locks for the associated resource.

While the hashing technique described above tends to distribute the resource mastering responsibility evenly among existing nodes, it has some significant drawbacks. For example, it is sometimes desirable to be able to select the exact node that will function as master node to a lock resource. For example, consider the situation when a particular lock resource is to be accessed exclusively by processes residing on node 102. In this situation, it would be inefficient to have the lock resource and the request queue for that resource located on any node in the network other than node 102. However, the relatively random distribution of lock resource management responsibilities that results from the hash function assignment technique makes it unlikely that resources will be mastered at the most efficient locations.

To address the inefficiency associated with the randomness of assigning masters based on a hash function, techniques have been developed for establishing resource-to-master-node assignments based on the affinity between (1) nodes and (2) the objects to which the resources belong. In this context, an "object" may be any entity that includes resources that are protected by locks. The types of objects to which the techniques described herein may be applied may vary based on the type of system in which the techniques are used. For example, within a relational database system, "objects" could include tables, table partitions, segments, extents, indexes, Large Objects (LOBs), etc. Within a file system, "objects" could include files, sets of file system metadata, etc. Within a storage system, "objects" could include storage devices, disk sectors, etc.

The "affinity" between a node and an object refers to the degree of efficiency achieved by assigning the node to be the master of the resources that belong to the object. For example, a particular node that accesses a table much more frequently than any other node has a high degree of affinity to the table. Relative to that table, the degree of affinity for that particular node is high because, if that node is assigned to be the master of the resources within the table, a high number of inter-node lock-related communications would be avoided. On the other hand, a node that accesses a table much less frequently than other nodes has a low degree of affinity to the table, because assigning that node to be the master of the table would avoid few inter-node lock-related communications.

The Related Applications describe various techniques related to mastering resources based on the affinity between nodes and the objects to which the resources belong. In general, once an affinity relationship has been established between an object and a node, the resources for the object cease to be randomly mastered across the nodes in the system. Instead, the node becomes master for all of the resources that belong to the object. On the other hand, when an affinity relationship is dissolved, the resources of the object are no longer mastered by the node with whom they had the affinity relationship. Instead, the resources are remastered across the nodes in the system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
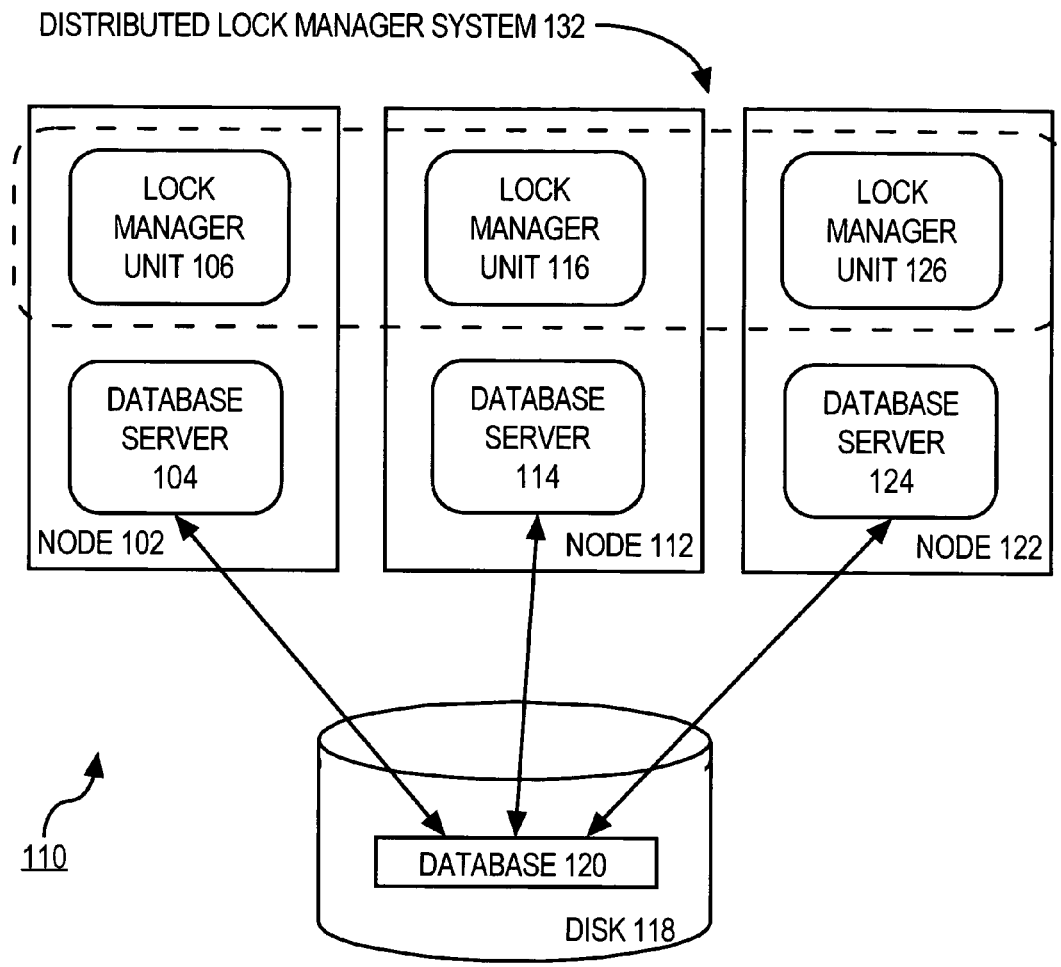
FIG. 1 is a block diagram of a computer system having a distributed lock manager.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Node Termination

A node may terminate for any number of reasons. For example, termination of a node may result from a hardware or software error. In addition, a node may be intentionally taken off line to be repaired or moved. When a node terminates for any reason, certain tasks have to be performed to ensure that the cluster to which the node belonged continues to operate correctly and efficiently. Typically, those tasks include (1) remastering resources that were mastered at the terminated node, (2) migrating transactions that were executing on the terminated node, and (3) recovering the resources that had been opened by the terminated node. Each of these tasks shall now be described in greater detail.

Remastering Resources that were Mastered at a Terminated Node

When a node fails, the resources that were mastered by that node have to be remastered by the remaining nodes. The resources that were mastered by a terminated node are referred to herein as the "to-be-remastered resources".

In systems that use affinity-based assignment mechanisms, the failure of a node in an affinity relationship may be an event that leads to the dissolution of the affinity relationship. Specifically, when a node in a cluster fails, any affinity relationships involving the node may be dissolved. After the affinity relationships of the terminated node are dissolved, none of the to-be-remastered resources will belong to an object that is in an affinity relationship. Since none of the to-be-remastered resources belong to objects that have affinity relationships with any of the remaining nodes, all of the to-be-remastered resources are randomly remastered across the remaining node using a hash function.

Migrating Transactions of a Terminated Node

In addition to remastering the to-be-remastered resources of a terminated node, the failure of the node may also result in a failover operation, where transactions that were being handled by the terminated node at the time of the failure are transferred to one or more of the remaining nodes. Automatic failover techniques are described, for example, in U.S. Pat. No. 6,490,610, entitled "Automatic Failover for Clients Accessing a Resource Through a Server", issued to Rizvi et al. on May 30, 1997, the contents of which are incorporated herein by reference. Planned failover techniques are described in U.S. Pat. No. 6,199,110, entitled "Planned Session Termination for Clients Accessing a Resource Through a Server", issued to Rizvi et al. on Mar. 6, 2001, the contents of which are incorporated herein by reference.

If the transactions that were executing on the terminated node are automatically migrated to a failover node, the failover node will have to obtain locks on the resources being used by those transactions. Obtaining those locks may also result in a significant amount of inter-node traffic.

Recovering Resources Held by a Terminated Node

When a node terminates unexpectedly, the resources that had been opened by the node may have been left in an inconsistent state. To return the resources to a consistent state, certain recovery operations need to be performed on the resources. Techniques for performing recovery operations on resources are described in U.S. Pat. No. 6,182,241, entitled "Method and Apparatus for Improved Transaction Recovery", issued to Ngai et al., on Jan. 20, 2001, the contents of which are incorporated herein by reference.

Typically, one of the remaining nodes is assigned to perform recovery operations on the resources that the terminated node had open at the time of the failure (the "to-be-recovered resources"). To perform recovery, the designated "recovery node" may have to obtain locks on the to-be-recovered resources. Obtaining those locks may result in a significant amount of inter-node traffic.

Affinity-Based Remastery During Recovery

As mentioned above, upon the termination of a node, current systems randomly remaster the resources that were mastered by the terminated node. The random remastery of those resources makes sense in systems where the resources that were mastered by the terminated node had been randomly assigned to the terminated node. However, in systems that use affinity-based assignment mechanisms, the random remastery of the to-be-remastered resources may lead to inefficiencies.

Specifically, the to-be-remastered resources may include many resources that belong to objects that had an affinity relationship with the terminated node. Such objects are referred to herein as "affinity objects". The resources that belong to affinity objects are referred to herein as "affinity resources".

Due to the affinity between the affinity objects and the terminated node, the terminated node may have had many open locks on affinity resources at the time the terminated node terminated. Consequently, many of the affinity resources may also be to-be-recovered resources. Because the recovery node will have to obtain locks on the to-be-recovered resources, and affinity resources are likely to be to-be-recovered resources, efficiency may be achieved by remastering the affinity resources at the recovery node.

According to one embodiment, affinity-based remastering is performed by transferring the affinity relationships of the terminated node to the recovery node. The transfer of the affinity relationships to the recovery node causes the affinity resources to be mastered at the recovery node. Resources that had been mastered at the terminated node that did not belong to objects involved in an affinity relationship could be remastered across all of the surviving nodes using a hash function.

After the affinity relationships of the terminated node have been transferred to the recovery node, the recovery of affinity resources will not require inter-node communication. If a high percentage of the to-be-recovered resources are affinity resources, then the amount of inter-node communication generated by the recovery operation may be dramatically reduced.

Affinity-Based Remastery During Failover

Due to the affinity between the affinity objects and the terminated node, the transactions that were being executed by the terminated node may be transactions that frequently access affinity resources. Consequently, there is a high likelihood that a failover node may heavily access the affinity resources after the transactions of the terminated node are transferred to the failover node. Because the failover node will have to obtain locks on the resources accessed by the transferred transactions, and the transferred transactions are likely to access affinity resources, efficiency may be achieved by remastering the affinity resources at the failover node.

According to one embodiment, affinity-based remastering is performed by transferring the affinity relationships of the terminated node to the failover node. The transfer of the affinity relationships to the failover node causes the affinity resources to be mastered at the failover node. Resources that had been mastered at the terminated node that did not belong to objects involved in an affinity relationship could be remastered across all of the surviving nodes using a hash function.

After the affinity relationships of the terminated node have been transferred to the failover node, operations in which the failover node accesses an affinity resource will not require inter-node communication. If a high percentage of the accesses performed by the transferred transactions involve affinity resources, then the amount of inter-node communication generated by the transferred transactions may be dramatically reduced.

Combined Failover-Recovery

As explained above, inter-node traffic may be reduced by either (1) remastering the affinity resources at the recovery node, or (2) remastering the affinity resources at the failover node. According to one embodiment, the affinity resources may be remastered at both the recovery node and the failover node by assigning the same node to be both the recovery node and the failover node of the terminated node.

In such an embodiment, termination of a node causes a surviving node to be selected to be both the recovery node and the failover node for the terminated instance. This selection may be based, for example, on characteristics of the surviving nodes, such as the number of CPUs, the amount of memory available, etc. Once a combined recovery/failover node is selected, the affinity relationships of the terminated node are automatically transferred to the combined recovery/failover node.

Because of recovery/failover node inherits the affinity relationships, all of the affinity resources are remastered at the recovery/failover node. Because the recovery/failover node is the master of the affinity resources, recovery operations performed on affinity resources do not cause inter-node lock-related traffic. Similarly, operations performed by the transferred transactions on any affinity resources do not cause inter-node lock-related traffic.

Dissolution of Affinity Relationships

As explained above, the affinity relationships of a terminated node are not automatically dissolved upon the termination of the node. Instead, those relationships are transferred to a recovery node, a failover node, or a combined recovery/ failover node. Once transferred, those affinity relationships continue until dissolved. The conditions that result in dissolution may vary from implementation to implementation.

For example, in an embodiment in which the affinity relationships are transferred to a recovery node, the affinity relationships that are transferred to a recovery node may be automatically dissolved upon completion of the recovery operation.

Similarly, in an embodiment in which the affinity relationships are transferred to a failover node, the affinity relationships may be dissolved when the failover node completes the execution of the transactions that were transferred from the terminated node.

In an alternative embodiment, the affinity relationships are not automatically dissolved upon completion of any specific task. Instead, the affinity relationships continue until affinity end conditions have been satisfied. Affinity end conditions may vary from implementation to implementation. Affinity end conditions are described in greater detail in the Related Applications.

EXAMPLE PROCESS FLOW

Figure 2:
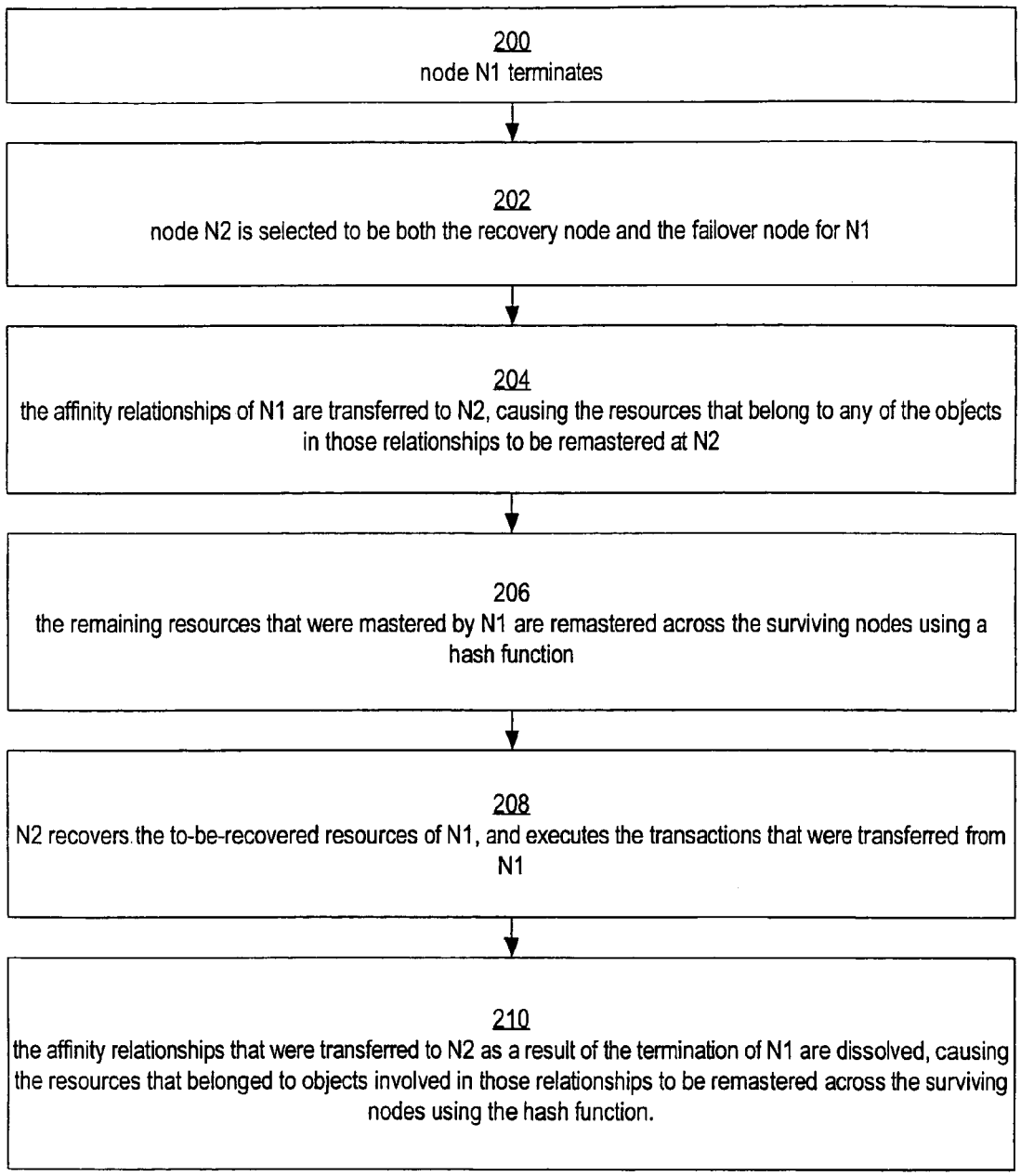
FIG. 2 is a block diagram that illustrates steps for responding to termination of a node, according to an embodiment of the invention.

FIG. 2 is a flowchart illustrating steps for responding to termination of a node in a system that implements an embodiment of the techniques described above. Referring to FIG. 2, at step 200, a node N1 terminates. As mentioned above, the termination may be planned or unplanned.

At step 202, a node N2 is selected to be both the recovery node and the failover node for N1. N2 may be based on a variety of factors, including memory capacity, processing capacity, and current workload.

At step 204, the affinity relationships of N1 are transferred to N2, causing the resources that belong to any of the objects in those relationships to be remastered at N2. At step 206, the remaining resources that were mastered by N1 are remastered across the surviving nodes using a hash function.

At step 208, N2 recovers the to-be-recovered resources of N1, and executes the transactions that were transferred from N1.

At step 210, the affinity relationships that were transferred to N2 as a result of the termination of N1 are dissolved, causing the resources that belonged to objects involved in those relationships to be remastered across the surviving nodes using the hash function.

Hardware Overview

Figure 3:
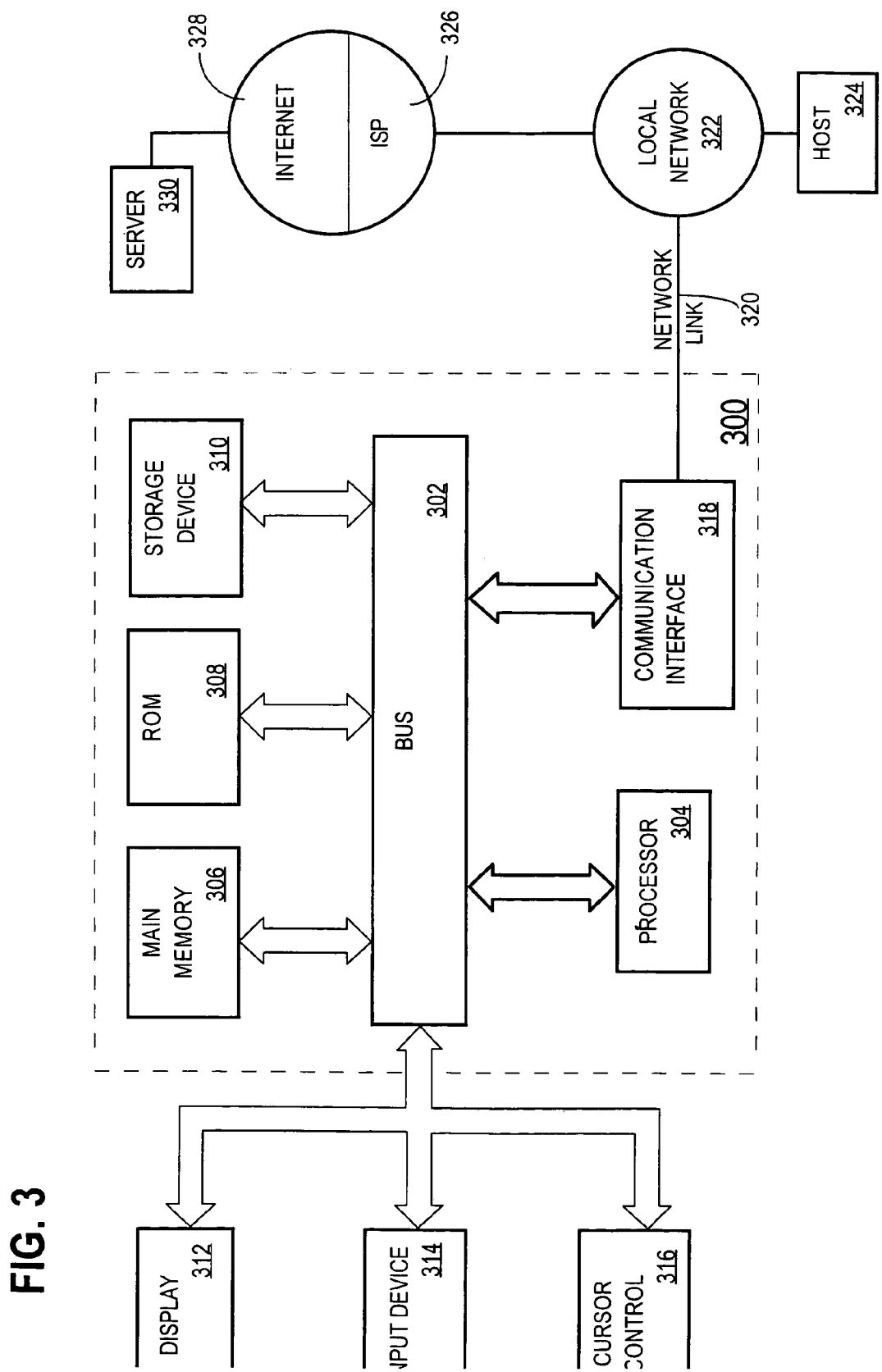
FIG. 3 is a block diagram of a computer system upon which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for responding to termination of a terminated node, the method comprising:
   using an affinity-independent assignment mechanism to cause a plurality of nodes to master all resources that belong to an object, wherein at least two resources that belong to the object are mastered by separate nodes of the plurality of nodes;
   using an affinity-based assignment mechanism to (a) establish an affinity relationship between a first node of the plurality of nodes and the object and (b) cause the first node to master all resources that belong to the object;
   in response to termination of the first node, determining that the affinity relationship is established between the terminated first node and object;
   in response to determining that the affinity relationship is established between the terminated first node and the object, causing a particular node of the plurality of nodes to master all resources that belong to the object by transferring the affinity relationship from the first node to the particular node;
   causing the particular node to perform at least one of:
      recovering resources that were opened by the terminated first node; and
      serving as a failover node to execute one or more transactions that had been executing on the terminated first node;
   wherein the method is performed by one or more computing devices.

2. The method of claim 1 wherein causing the particular node to perform includes causing the particular node to perform both of:
   recovering resources that were opened by the terminated first node; and
   serving as a failover node to execute one or more transactions that had been executing on the terminated first node.

3. The method of claim 1, further comprising:
   dissolving said affinity relationship between the particular node and said object in response to the particular node completing the recovery of resources that were opened by the terminated first node.

4. The method of claim 1, further comprising:
   dissolving said affinity relationship between the particular node and said object in response to the particular node completing execution of the one or more transactions that had been executing on the terminated first node.

5. The method of claim 1 wherein at the time of termination of the terminated first node, the terminated first node is master of a set of certain resources for which an affinity relationship is not established between any object and said terminated first node, the method further comprising:
   in response to termination of the terminated first node, remastering said set of certain resources among one or more of the plurality of nodes that remain after termination of the terminated first node.

6. The method of claim 1 wherein termination of the terminated first node is an unplanned termination caused by a failure.

7. The method of claim 1 wherein termination of the terminated first node is a planned termination.

8. The method of claim 1, further comprising:
   selecting the particular node to be the recovery node for the terminated first node based on one or more characteristics of the particular node.

9. The method of claim 1, further comprising:
   selecting the particular node to be the failover node for the terminated first node based on one or more characteristics of the particular node.

10. A computer-readable storage medium storing one or more sequences of instructions which, when executed by one or more processors, causes the one or more processors to perform:
   using an affinity-independent assignment mechanism to cause a plurality of nodes to master all resources that belong to an object, wherein at least two resources that belong to the object are mastered by separate nodes of the plurality of nodes;
   using an affinity-based assignment mechanism to (a) establish an affinity relationship between a first node of the plurality of nodes and the object and (b) cause the first node to master all resources that belong to the object;

in response to termination of the first node, determining that the affinity relationship is established between the terminated first node and the object;

in response to determining that the affinity relationship is established between the terminated first node and the object, causing a particular node of the plurality of nodes to master all resources that belong to the object by transferring the affinity relationship from the first node to the particular node;

causing the particular node to perform at least one of:
  recovering resources that were opened by the terminated first node; and
  serving as a failover node to execute one or more transactions that had been executing on the terminated first node.

11. The computer-readable storage medium of claim 10 wherein causing the particular node to perform includes causing the particular node to perform both of:
  recovering resources that were opened by the terminated first node; and
  serving as a failover node to execute one or more transactions that had been executing on the terminated first node.

12. The computer-readable storage medium of claim 10, the one or more sequences of instructions further comprising instructions for dissolving said affinity relationship between the particular node and said object in response to the particular node completing the recovery of resources that were opened by the terminated first node.

13. The computer-readable storage medium of claim 10, the one or more sequences of instructions further comprising instructions for dissolving said affinity relationship between the particular node and said object in response to the particular node completing execution of the one or more transactions that had been executing on the terminated first node.

14. The computer-readable storage medium of claim 10 wherein at the time of termination of the terminated first node, the terminated first node is master of a set of certain resources for which an affinity relationship is not established between any object and said terminated first node, the one or more sequences of instructions further comprising instructions for:
  in response to termination of the terminated first node, remastering said set of certain resources among one or more of the plurality of nodes that remain after termination of the terminated first node.

15. The computer-readable storage medium of claim 10 wherein termination of the terminated first node is an unplanned termination caused by a failure.

16. The computer-readable storage medium of claim 10 wherein termination of the terminated first node is a planned termination.

17. The computer-readable storage medium of claim 10, the one or more sequences of instructions further comprising instructions for selecting the particular node to be the recovery node for the terminated first node based on one or more characteristics of the particular node.

18. The computer-readable storage medium of claim 10, the one or more sequences of instructions further comprising instructions for selecting the particular node to be the failover node for the terminated first node based on one or more characteristics of the particular node.

* * * * *

UNITED STATES PATENT AND TRADEMARK OFFICE
CERTIFICATE OF CORRECTION

| | | |
|---|---|---|
| PATENT NO. | : 7,814,065 B2 | Page 1 of 1 |
| APPLICATION NO. | : 11/205529 | |
| DATED | : October 12, 2010 | |
| INVENTOR(S) | : Wilson Wai Shun Chan et al. | |

It is certified that error appears in the above-identified patent and that said Letters Patent is hereby corrected as shown below:

In column 1, line 13, delete "on same day herewith," and insert -- on May 18, 2005, --, therefor.

In column 1, line 17-18, delete "on same day herewith," and insert -- on May 18, 2005, --, therefor.

In column 9, line 67, in claim 1, after "and" insert -- the --.

Signed and Sealed this
Thirty-first Day of May, 2011

David J. Kappos
*Director of the United States Patent and Trademark Office*